Sept. 12, 1967  J. A. TOURTELLOT  3,341,723
ELECTRIC MOTOR
Filed Sept. 30, 1964

INVENTOR.
JOHN A. TOURTELLOT
BY
Eugene M. Whitacre
Attorney

United States Patent Office 3,341,723
Patented Sept. 12, 1967

3,341,723
ELECTRIC MOTOR
John A. Tourtellot, Indianapolis, Ind., assignor to Radio Corporation of America, a corporation of Delaware
Filed Sept. 30, 1964, Ser. No. 400,493
4 Claims. (Cl. 310—68)

This invention relates to electric motors and more particularly to alternating current motors of a type having transformer windings coupled to the motor field windings.

In electronic instruments containing alternating current (A.-C.) motors, such as phonographs or tape recorders, it has been suggested that an additional winding inductively coupled to the motor field winding may be used in the power supply for the electronic portions of the instrument. A cost and space savings is realized by this arrangement since there is no requirement for a separate power transformer. However, in the prior systems, the advantages were offset by inferior and inefficient motor performance. One reason for the degraded motor operation is that a pulsating direct current (D.-C.) flux is introduced into the motor iron when a power supply is connected to the additional winding.

Another problem with the combined motor-transformer structure is that with a motor of a given size, there is a limited space for the two windings. Thus, a relatively small wire size is required to achieve the necessary number of turns in the field winding and the additional winding. The small wire size increases the power dissipation and heat generated by the motor-transformer structure.

It is an object of this invention to provide an improved motor-transformer structure.

It is another object of this invention to provide an improved A-C motor-transformer structure which exhibits efficient motor performance while supplying substantial power to an A-C to D-C power supply.

A combined motor-transformer structure embodying the invention includes a field winding and an additional winding on a portion of the A-C motor core. An additional core portion is coupled to the motor core to produce a magnetic shunt around that portion of the motor core on which the field winding and additional winding are mounted. Because of the magnetic flux diverting action of the shunt, the number of field winding turns is reduced to generate more flux than is required without the shunt in order to establish the desired flux density through the motor armature. The reduced number of field winding turns means that fewer turns of the additional winding are required to maintain the same turns ratio. Accordingly larger size wire may be used to reduce the power consumption and heat generated by the motor-transformer structure. In addition, the shunt carries a substantial portion of the D-C flux produced by the additional winding due to connections to associated electric equipment thereby reducing the D-C flux in the armature.

Figure 1:
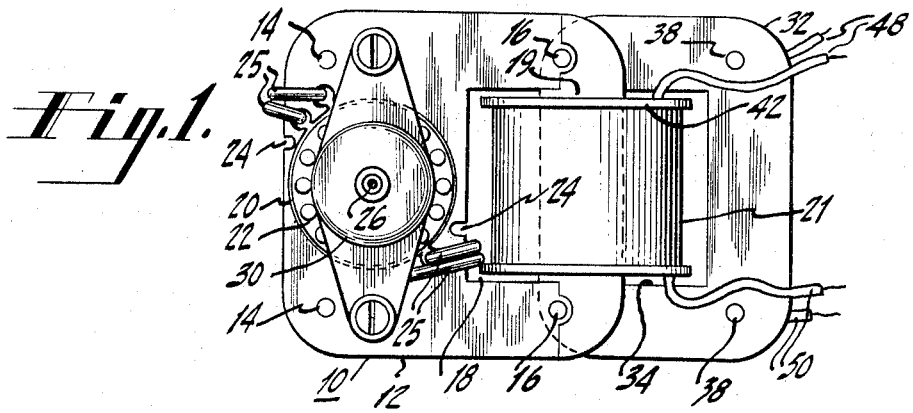
FIGURE 1 is a top view of the combined motor-transformer structure embodying the invention.

In referring to the drawings, like reference numerals designate the same components throughout. FIGURE 1 illustrates a combined motor-transformer 10 embodying the invention. The motor in the present example is a shaded pole motor, a type commonly used in driving phonograph turntables and tape recorders etc. The shaded poles motor of FIGURES 1 and 2 includes a substantially rectangular core or stator 12. The core 12 is composed of a stack of laminations, stamped from sheets of magnetic iron or other appropriate material, held together by rivets 14 and 16.

A leg 19 is formed at one end of the core 12 on which a coil of wire 21 is mounted. The core 12 provides a substantially circular opening 20 for receiving a cylindrical squirrel-cage rotor or armature 22. The laminations of the core 12 have grooves 24 in diametrically opposing sides of the opening 20 forming the pole pieces for driving the armature 22. Two shading coils 25 surround each pole piece and form the auxiliary phase for shaded pole motor operation. The operation of a shaded pole motor is well-known and needs no further explanation.

Figure 2:
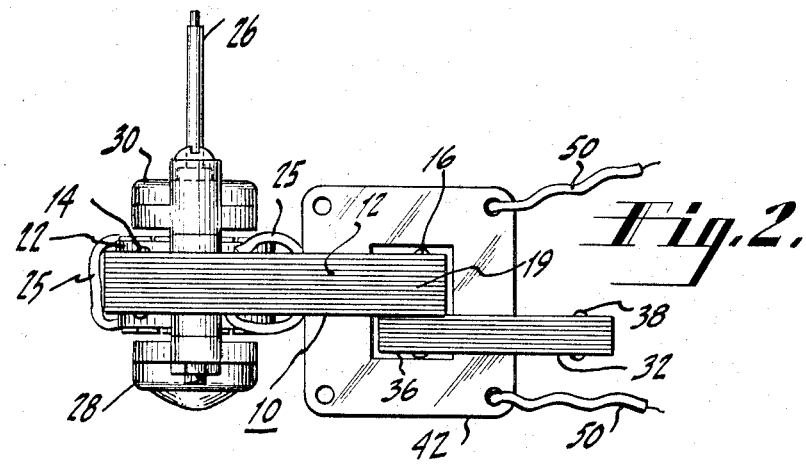
FIGURE 2 is a side view of the motor-transformer of FIGURE 1.

The shaft 26 of armature 22 is journaled for rotation in the bearings 28 and 30 attached to the opposite side of the core 12 (FIGURE 2).

An electromagnetic flux path that parallels the path through core 12 is provided by a substantially rectangularly shaped shunt core member 32. The shunt core member 32 is composed of a stack of laminations of similar material to that used in the core 12 and is held together by rivets 38 and 16. The shunt core member 32 is formed with a central opening 34, and in the present example, is disposed in a plane parallel to that of core 12 with a core leg 36 underlying the core leg 19 of the core 12 (as viewed in FIGURE 2).

Both the core legs 19 and 36 are surrounded by the coil of wire 21 (FIGURE 1) which is secured on an insulating spool 42. The coil 21 includes two separate and concentric windings, the field or primary winding 44 having the input leads 48 and an additional or secondary winding 46 having the output leads 50 (FIGURES 1, 2 and 3).

Figure 3:
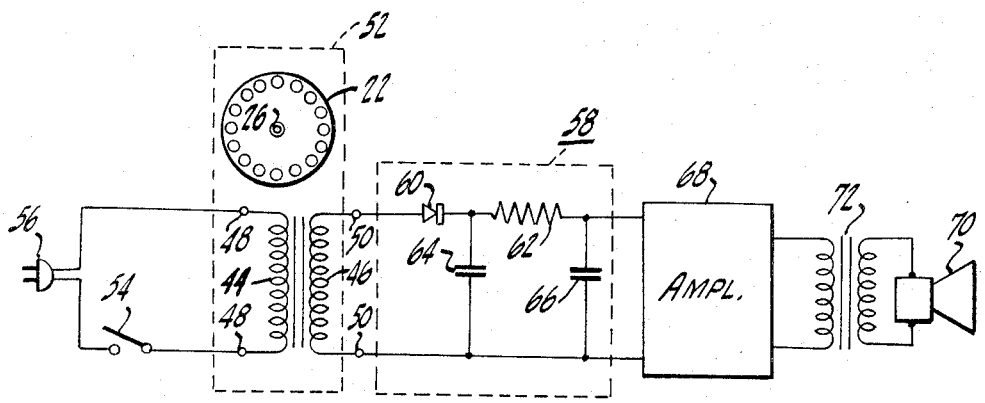
FIGURE 3 is a schematic diagram of the inter-connections between the combined motor-transformer of FIGURE 1 and associated electronic equipment.

The combined motor-transformer 10 is schematically illustrated in FIGURE 3 within a dashed block 52 and is shown connected with associated electronic equipment such as that found in tape recorders, phonographs, etc. The field 44 is adapted to be energized by a source of alternating current, such as that of a 115-volt 60-cycle wall socket, through an on-off switch 54 and a plug 56. The field winding 44 produces sufficient magnetic flux in the core member 12 to drive the armature 22, and also to power the secondary winding 46 through a transformer action between the two windings.

The secondary winding 46 is shown connected to a power supply 58 which includes a rectifier 60, and a filter circuit including a series resistor 62 and two shunt capacitors 64 and 66. The output of the power supply energizes an audio amplifier 68 and assoicated circuits which are connected to drive a loudspeaker 70 through an output transformer 72.

In prior motor-transformer devices, the D-C through the secondary winding 46 due to the rectifying action of rectifier 60, produces a pulsating D-C flux in the associated core. Without the attached shunt core 32, all the D-C flux flows through the core 12 thereby deleteriously affecting the operation of the motor. The addition of the shunt core member 32 provides a low reluctance flux path in parallel with the flux path of the core 12 thereby reducing the total amount of D-C flux that travels through the core 12 and armature 22, by a ratio dependent upon relative reluctances of the two flux paths.

Since the shunt core 32 diverts a portion of the magnetic flux generated by the field winding 44, the motor design must be such that the field winding provides more flux than for motors without the shunt, in order that the flux density through the armature 22 remains the same. To increase the amount of flux generated by the field winding 44, the number of turns of the winding 44 is reduced. The decrease in number of field winding 44 turns results in a decrease in the number of turns of the secondary winding 46 to keep a given transformer turns ratio. This decrease in the total number of winding turns provides for extra space thereby enabling the use of wire having a larger diameter. For example, without the sunt core member 32, the field winding 44 required 1600 turns of a number 30 wire while the secondary winding 46 required 300 turns of number 27 wire.

With the shunt core member 32 the number of primary turns is reduced to 1200 turns of number 29 wire (larger diameter) while the secondary winding is reduced to 225 turns of number 24 wire (larger diameter). With the lower resistance windings (fewer turns of larger wire) permitted by the shunt 32 the motor efficiency was found to increase to 77% from 58% for a motor without a magnetic shunt but similarly loaded. There is less power dissipated in the lower resistance windings and accordingly the motor-transformer 10 operates at a lower temperature for a given amount of power output thereby reducing the heat dissipation problems associated with the design of an instrument using the motor-transformer.

What is claimed is:
1. A combined motor-transformer comprising:
 a magnetic core having at least two parallel electromagnetic flux paths, said flux paths having a common portion;
 a first of said flux paths providing a plurality of pole pieces;
 a motor armature rotatably mounted between said pole pieces,
 first and second coil windings, said first winding surrounding said common flux path portion and being adapted to be connected to a source of alternating current to create a magnetic flux in said flux paths, said second winding surrounding said common flux paths to provide a source of output alternating current through transformer action with said first winding, and
 circuit means coupled to said second winding and responsive to said output alternating current voltage for causing a direct current to flow through said second winding.

2. A combined motor-transformer comprising:
 a magnetic core member having two parallel flux paths and a common flux path portion;
 one of said flux paths including field pole pieces defining an opening for receiving a motor armature;
 means for rotatably mounting said motor armature on said core member;
 a first winding adapted to be connected to a source of energizing potential surrounding said common portion of said flux paths to provide an electromagnetic flux through both of said parallel flux paths,
 a second winding electromagnetically coupled to said first winding to provide an output source of alternating current voltage through transformer action between said first and second windings, and
 circuit means coupled to said second winding and responsive to said alternating current voltage so as to cause a direct current to flow through said second winding.

3. In an alternating current motor having a first magnetic core providing the field for a motor armature and a field winding wound about a portion of said magnetic core adapted to be connected to an alternating source of alternating current voltage for creation of an alternating magnetic flux in said magnetic core for motor operation of said armature, the combination comprising:
 a second and separate magnetic core, a portion of which is integral with said first magnetic core and surrounded by said winding, providing a flux path for bypassing a portion of said magnetic flux created by said winding from flowing in said motor core,
 a second winding electromagnetically coupled to said field winding providing a source of output alternating current voltage through a transformer action between said first and second windings, and
 circuit means coupled to said winding for causing a direct current to flow therethrough.

4. The combination defined in claim 3 wherein said circuit means including a rectifier coupled to one end of said second winding and adapted to cause a direct current to flow therethrough.

References Cited

UNITED STATES PATENTS

| 2,097,577 | 11/1937 | Seitner | 307—156 |
| 2,406,704 | 8/1946 | Mossay | 307—156 |
| 2,585,059 | 2/1952 | Wallace | 307—156 |

FOREIGN PATENTS

| 597,507 | 1/1948 | Great Britain. |

MILTON O. HIRSHFIELD, *Primary Examiner.*

J. D. MILLER, *Assistant Examiner.*